(12) United States Patent
Uemura

(10) Patent No.: US 12,218,571 B2
(45) Date of Patent: Feb. 4, 2025

(54) MOTOR COOLING SYSTEM AND MOTOR COOLING MONITORING METHOD

(71) Applicant: MEIDENSHA CORPORATION, Tokyo (JP)

(72) Inventor: Kiyoshi Uemura, Numazu (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 18/714,013

(22) PCT Filed: Aug. 24, 2022

(86) PCT No.: PCT/JP2022/031798
§ 371 (c)(1),
(2) Date: May 28, 2024

(87) PCT Pub. No.: WO2023/095401
PCT Pub. Date: Jun. 1, 2023

(65) Prior Publication Data
US 2024/0421666 A1    Dec. 19, 2024

(30) Foreign Application Priority Data
Nov. 29, 2021 (JP) ................. 2021-192662

(51) Int. Cl.
*H02K 9/24* (2006.01)
*H02K 9/19* (2006.01)
*H02K 11/20* (2016.01)
*H02K 11/33* (2016.01)

(52) U.S. Cl.
CPC ............ *H02K 9/24* (2013.01); *H02K 9/19* (2013.01); *H02K 11/20* (2016.01); *H02K 11/33* (2016.01)

(58) Field of Classification Search
CPC .......... H02K 9/24; H02K 11/20; H02K 11/33; H02K 11/30; H02K 9/19; H02K 9/193; H02K 9/197; H02K 9/18; H02K 11/38
USPC ............................. 310/53, 62, 63, 54, 52, 58
See application file for complete search history.

(56) References Cited

FOREIGN PATENT DOCUMENTS

| CN | 113550819 A | 10/2021 |
|---|---|---|
| JP | S54-089411 U | 6/1979 |
| JP | S54-089412 U | 6/1979 |
| JP | S57-145546 A | 9/1982 |
| JP | 2008-256313 A | 10/2008 |
| JP | 2013-243876 A | 12/2013 |
| JP | 2018-152944 A | 9/2018 |
| JP | 2019-210969 A | 12/2019 |
| JP | 2021-069166 A | 4/2021 |

*Primary Examiner* — Alexander A Singh
(74) *Attorney, Agent, or Firm* — Foley & Lardner LLP

(57) ABSTRACT

In a motor cooling system 1, a determination unit 33 is configured to perform periodic sampling of a driving current Ip or a rotation speed Np of an oil pump 23, and detect a decrease in cooling oil of a motor 2 when it is determined that a standard deviation of the driving current Ip or the rotation speed Np with respect to a plurality of sampling points is larger than a preset threshold value. The threshold value is set on the bases of a measurement value of the driving current Ip or the rotation speed Np of the oil pump 23 which is obtained by an operation test of the motor 2 in a state in which the cooling oil has decreased.

14 Claims, 2 Drawing Sheets

MOTOR COOLING SYSTEM AND MOTOR COOLING MONITORING METHOD

TECHNICAL FIELD

The present invention relates to a cooling technology of an oil cooled motor.

BACKGROUND TECHNOLOGY

As a cooling method for a motor to be mounted on a vehicle, cooling oil stored in an oil pan inside a housing of a motor is circulated by an electric oil pump to cool a part of the motor such as a stator coil (see patent document 1). The cooling oil used for the cooling is cooled by cooling water passed through an oil cooler.

PRIOR ART REFERENCE(S)

Patent Document(s)

Patent Document 1: Japanese Patent Application Publication No. 2018-152944
Patent Document 2: Japanese Patent Application Publication No. 2013-243876

SUMMARY OF THE INVENTION

When the amount of the cooling oil of the motor decreases due to aged deterioration of a sealing part or cracks of the housing of the motor and the oil level is lowered to a level equal to or lower than a suction port of the cooling oil of the oil pan, air is sucked together with the cooling oil. Consequently, the specific gravity of the cooling oil to be injected to a cooled part such as a stator coil is reduced, and the cooling cannot be sufficiently performed. If the motor is continuously used in this state, the motor is heated and shortened in its lifetime, and is broken down in the worst case.

The present invention is made in consideration of such a technical problem, and an object of the present invention is to suppress a motor from being heated and damaged by detecting a decrease in cooling oil due to aged deterioration of a sealing part or cracks of a housing of the motor.

Therefore, one aspect of the present invention is a motor cooling system including: an oil pump for circulating cooling oil of a motor; and a determination unit configured to detect a decrease in the cooling oil when a standard deviation of a driving current of the oil pump with respect to a plurality of sampling points of the driving current is larger than a preset threshold value.

In one aspect of the present invention, the motor cooling system further includes an inverter for driving the motor, wherein the determination unit outputs a torque limit value according to the standard deviation of the driving current when the decreasing of the cooling oil is detected, and wherein a control unit of the inverter outputs a gate signal for switching on and off a switching element of a main circuit of the inverter based on a torque command value after performing a limit processing to a torque command value received from a higher-order system of the motor so as not to exceed the torque limit value.

One aspect of the present invention is a motor cooling system including: an oil pump for circulating cooling oil of a motor; and a determination unit configured to detect a decrease in the cooling oil when a state in which a moving average value of a driving current of the oil pump which is obtained from a plurality of sampled data of the driving current is excessively smaller than a preset standard driving current by a certain amount is continued for a predetermined time.

In one aspect of the present invention, the motor cooling system further includes an inverter for driving the motor, wherein the determination unit outputs a torque limit value according to the moving average value of the driving current when the decreasing of the cooling oil is detected, and wherein a control unit of the inverter outputs a gate signal for switching on and off a switching element of a main circuit of the inverter based on a torque command value after performing a limit processing to a torque command value received from a higher-order system of the motor so as not to exceed the torque limit value.

One aspect of the present invention is a motor cooling system including: an oil pump for circulating cooling oil of a motor; and a determination unit configured to detect a decrease in the cooling oil when a standard deviation of a rotation speed of the oil pump with respect to a plurality of sampling points of the rotation speed is larger than a preset threshold value.

In one aspect of the present invention, the motor cooling system further includes an inverter for driving the motor, wherein the determination unit outputs a torque limit value according to the standard deviation of the rotation speed when the decreasing of the cooling oil is detected, and wherein a control unit of the inverter outputs a gate signal for switching on and off a switching element of a main circuit of the inverter based on a torque command value after performing a limit processing to a torque command value received from a higher-order system of the motor so as not to exceed the torque limit value.

One aspect of the present invention is a motor cooling system including: an oil pump for circulating cooling oil of a motor; and a determination unit configured to detect a decrease in the cooling oil when a state in which a moving average value of a rotation speed of the oil pump which is obtained from a plurality of sampled data of the rotation speed is excessively smaller than a preset standard rotation speed by a certain amount is continued for a predetermined time.

In one aspect of the present invention, the motor cooling system further includes an inverter for driving the motor, wherein the determination unit outputs a torque limit value according to the moving average value of the rotation speed when the decreasing of the cooling oil is detected, and wherein a control unit of the inverter outputs a gate signal for switching on and off a switching element of a main circuit of the inverter based on a torque command value after performing a limit processing to a torque command value received from a higher-order system of the motor so as not to exceed the torque limit value.

In one aspect of the present invention, in the motor cooling system, the determination unit outputs a warning signal to an outside when the decreasing of the cooling oil is detected One aspect of the present invention is a motor cooling monitoring method including: detecting a decrease in cooling oil of a motor when a standard deviation of a driving current or a rotation speed of an oil pump for circulating the cooling oil of the motor with respect to a plurality of sampling points of the driving current or the rotation speed is larger than a preset threshold value.

One aspect of the present invention is a motor cooling monitoring method in a motor cooling system having an oil pump for circulating cooling oil of a motor including:

detecting a decrease in the cooling oil when a state in which a moving average value of a driving current or a rotation speed of the oil pump which is obtained from a plurality of sampled data of the driving current or the rotation speed is excessively smaller than a preset standard driving current or a preset standard rotation speed by a certain amount is continued for a predetermined time.

According to the above present invention, it is possible to suppress a motor from being heated or damaged by detecting a decrease in cooling oil due to aged deterioration of a sealing part or cracks of a housing of a motor.

MODE FOR IMPLEMENTING THE INVENTION

Figure 1:
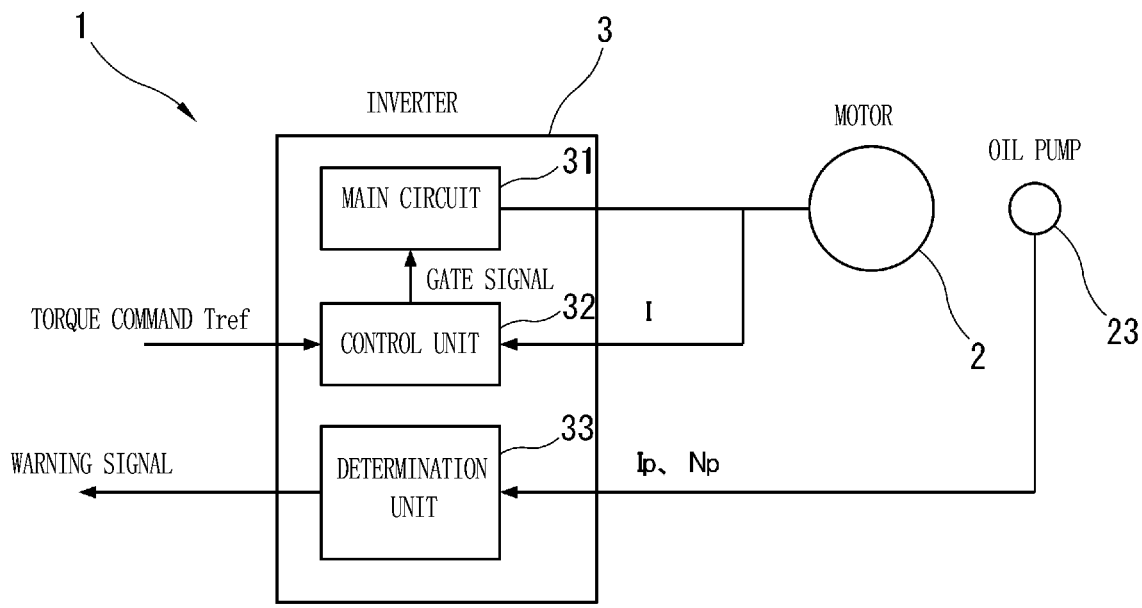
FIG. 1 is a schematic diagram of a motor cooling system that is one aspect of the present invention.

In the following, an embodiment of the present invention will be explained by referring to the drawings.

Figure 2:
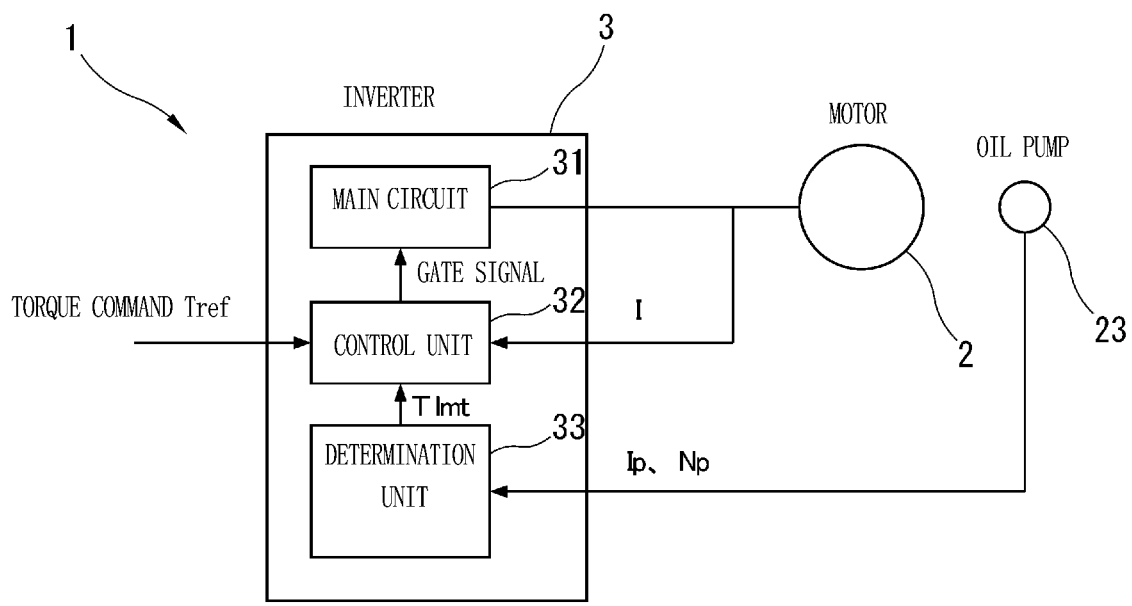
FIG. 2 is a schematic diagram of a motor cooling system that is one aspect of the present invention.
Figure 3:
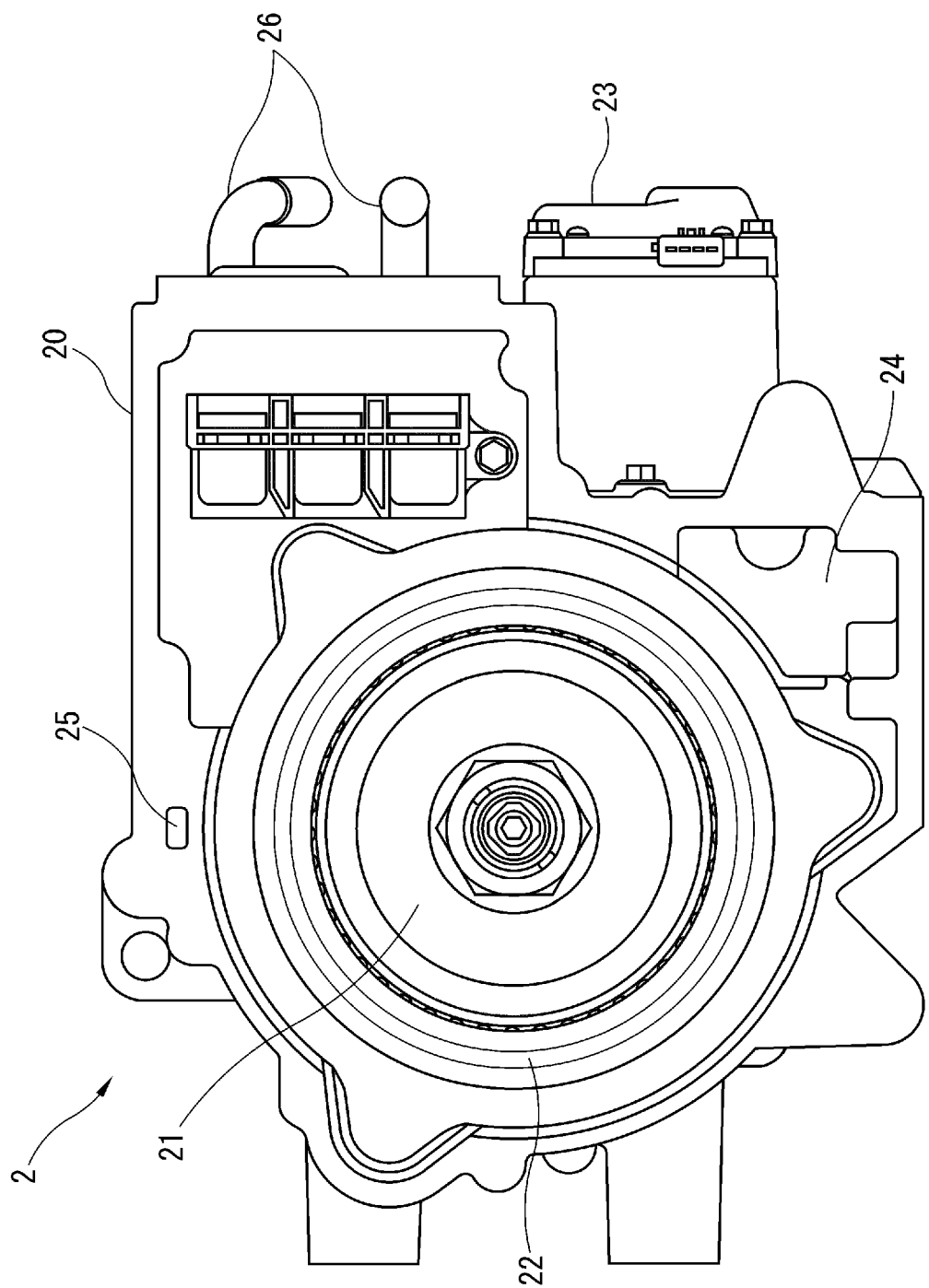
FIG. 3 is a sectional view of a motor to which a motor cooling system that is one aspect of the present invention is applied.

A motor cooling system 1 of a first embodiment shown in FIGS. 1 and 2 which is one aspect of the present invention is applied to an oil cooled motor 2 illustrated in FIG. 3.

The motor cooling system 1 cools a stator coil 22 by circulating and supplying cooling oil to the stator coil 22 disposed coaxially with a rotor 21 of the motor 2. The cooling oil is supplied by an oil pump 23 provided to the motor 2 and is injected to the stator coil 22 inside a housing 20 of the motor 2 via an oil passage 25 formed to the housing 20. The flow rate of the cooling oil is controlled by the rotation speed of the oil pump 23. The rotation speed is controlled by an exclusive motor equipped to the oil pump 23 which is not shown in the drawings. The cooling oil used for the cooling is transferred to an oil pan 24 formed to the housing 20. The cooling oil stored in the oil pan 24 is supplied to the oil passage 25 by the oil pump 23 and is cooled by cooling water passed through an oil cooler 26 of the motor 2.

In the following, a specific embodiment of the motor cooling system 1 will be explained.

First Embodiment

The motor cooling system 1 of a first embodiment shown in FIG. 1 is provided with a determination unit 33 configured to periodically monitor a driving current Ip of the oil pump 23 and detect a decrease in cooling oil based on a standard deviation of the driving current Ip with respect to a plurality of sampling points of the driving current Ip.

For example, the determination unit 33 is provided to an inverter 3 or is provided separately from the inverter 3. In addition, the inverter 3 is provided with a main circuit 31 for driving the motor 2 and a control unit 32 configured to output a gate signal based on a motor current "I" of the motor 2 to the main circuit 31.

When cooling oil decreases and the oil level of the oil pan 24 is lowered due to aged deterioration of a sealing part or cracks of the housing 20 of the motor 2 and air enters, the load to the oil pump 23 fluctuates, and the driving current Ip of the oil pump 23 is irregularly changed.

The determination unit 33 detects a decrease in cooling oil by using the change of the driving current Ip due to the fluctuation of the load. That is, the determination unit 33 performs the periodic sampling of the driving current Ip of the oil pump 23 and detects a decrease in cooling oil when it is determined that the standard deviation of the driving current Ip with respect to a plurality of the sampling points is larger than a threshold value. The threshold value is previously set based on a measured value of the driving current Ip of the oil pump 23 obtained by the test operation of the motor 2 in a state in which cooling oil has decreased and on a standard deviation calculation value at that time.

According to the motor cooling system 1 mentioned above, by monitoring the fluctuation of the driving current Ip of the oil pump 23, a decrease in cooling oil due to aged deterioration of a sealing part or cracks of the housing 20 of the motor 2 can be detected. Therefore, insufficient circulation and a decrease in cooling oil of the motor 2 caused by the aged deterioration or cracks can be suppressed, and the heating and damage of the motor 2 can be suppressed, thereby previously suppressing a deterioration in a lifetime and failure of the motor 2.

Second Embodiment

The determination unit 33 of a second embodiment is configured to periodically monitor a rotation speed Np of the oil pump 23 instead of the driving current Ip in the first embodiment and detect a decrease in cooling oil based on a standard deviation of the rotation speed Np with respect to a plurality of sampling points of the rotation speed Np.

When cooling oil decreases and the oil level of the oil pan 24 is lowered due to aged deterioration of a sealing part or cracks of the housing 20 of the motor 2 and air enters, the load to the oil pump 23 fluctuates, and the rotation speed Np of the oil pump 23 is irregularly changed.

The determination unit 33 detects a decrease in cooling oil by using the change of the rotation speed Np due to the fluctuation of the load. That is, the determination unit 33 performs the periodic sampling of the rotation speed Np of the oil pump 23 and detects a decrease in cooling oil when it is determined that the standard deviation of the rotation speed Np with respect to a plurality of the sampling points is larger than a threshold value. Similar to the first embodiment, the threshold value is previously set based on a measured value of the rotation speed Np of the oil pump 23 obtained by the test operation of the motor 2 in a state in which cooling oil has decreased and on a standard deviation calculation value at that time.

According to the motor cooling system 1 mentioned above, by monitoring the fluctuation of the rotation speed Np of the oil pump 23, a decrease in cooling oil caused by aged deterioration of a sealing part or cracks of the housing 20 of the motor 2 can be detected. Therefore, similar to the first embodiment, the heating and damage of the motor 2 can be suppressed, thereby previously suppressing a deterioration in a lifetime and failure of the motor 2.

Third Embodiment

The determination unit 33 of a third embodiment is configured to detect a decrease in cooling oil based on a moving average value of the driving current Ip of the oil pump 23 with respect to a standard driving current based on the relationship between a cooling oil temperature and a driving control voltage of the oil pump 23, moving average value which is obtained from several sampled data of the driving current Ip.

When cooling oil decreases and the oil level of the oil pan 24 is lowered due to aged deterioration of a sealing part or cracks of the housing 20 of the motor 2 and air enters, the load to the oil pump 23 is reduced, and the driving current Ip of the oil pump 23 is lowered while being irregularly changed.

The determination unit 33 is configured to detect a decrease in cooling oil when it is determined that a state in which the moving average value of the driving current Ip which is obtained from a plurality of sampled data of the driving current Ip is excessively smaller than the standard driving current by a certain amount is continued for a predetermined time. The standard driving current is previously set based on the driving current measured value of the oil pump 23 at the time of a prior test in which the motor 2 is operated in a state in which cooling oil has decreased. In addition, the period of the calculation of the moving average value is set to be longer than the period in which the driving current Ip of the oil pump 23 is irregularly changed in the first embodiment.

According to the motor cooling system 1 mentioned above, by monitoring the moving average value of the driving current Ip of the oil pump 23, a decrease in cooling oil due to aged deterioration of a sealing part or cracks of the housing 20 of the motor 2 can be detected. Therefore, similar to the first and second embodiments, the heating and damage of the motor 2 can be suppressed, thereby previously suppressing a deterioration in a lifetime and failure of the motor 2.

Fourth Embodiment

The determination unit 33 of a fourth embodiment is configured to detect a decrease in cooling oil based on a moving average value of the rotation speed Np of the oil pump 23 with respect to a standard rotation speed of the oil pump 23 which is applied instead of the standard driving current in the third embodiment, moving average value which is obtained from several sampled data of the rotation speed Np.

When cooling oil decreases and the oil level of the oil pan 24 is lowered due to aged deterioration of a sealing part or cracks of the housing 20 of the motor 2 and air enters, the load to the oil pump 23 is reduced, and the rotation speed Np of the oil pump 23 is lowered while being irregularly changed.

The determination unit 33 is configured to detect a decrease in cooling oil when it is determined that a state in which the moving average value of the rotation speed Np which is obtained from a plurality of sampled data of the rotation speed Np is excessively smaller than the standard rotation speed by a certain amount is continued for a predetermined time. The standard rotation speed is previously set based on the rotation speed measured value of the oil pump 23 at the time of a prior test in which the motor 2 is operated in a state in which cooling oil has decreased. In addition, similar to the third embodiment, the period of the calculation of the moving average value is set to be longer than the period in which the rotation speed Np of the oil pump 23 is irregularly changed in the second embodiment.

According to the motor cooling system 1 mentioned above, by monitoring the moving average value of the rotation speed Np of the oil pump 23, a decrease in cooling oil due to aged deterioration of a sealing part or cracks of the housing 20 of the motor 2 can be detected. Therefore, similar to the first to third embodiments, the heating and damage of the motor 2 can be suppressed, thereby previously suppressing a deterioration in a lifetime and failure of the motor 2.

Fifth Embodiment

The determination unit 33 of a fifth embodiment is configured to output a warning signal indicating the decreasing of the cooling oil to the outside of the inverter 3 when the decreasing of the cooling oil is detected and issue a warning to a user, in the first to fourth embodiments. Therefore, according to the present embodiment, it is possible to notice a decrease in cooling oil due to aged deterioration of a sealing part or cracks of the housing 20 of the motor 2.

In addition, in the fifth embodiment, since special control is not performed to the inverter 3 at the time when abnormality is determined (at the time when a decrease in cooling oil is determined), it is not necessary to provide the determination unit 33 into the inverter 3, and the fifth embodiment can also be applied to a system for driving a motor 2 without the inverter 3.

Sixth Embodiment

The inverter 3 of a sixth embodiment shown in FIG. 2 reduces an electric current to be supplied to the motor 2 by performing torque control of the motor 2 when a decrease in cooling oil is detected with a method of any of the first to fifth embodiments, so as to previously suppress a deterioration in a lifetime and failure of the motor 2 due to abnormal heating of the motor 2.

The determination unit 33 is configured to detect the motor current I of the motor 2, the driving current Ip or the rotation speed Np of the oil pump 23 and determine a decrease in cooling oil with a method of any of the first to fourth embodiments. Then, when the decreasing of cooling oil is detected, the determination unit 33 outputs a torque limit value Tlmt to the control unit 32. In addition, as the torque limit value Tlmt, an appropriate value according to the standard deviation or the moving average value of the driving current Ip or the rotation speed Np of the oil pump 23 is previously set based on a prior test, is further datatabled, and is stored in a memory inside the determination unit 33.

Next, the control unit 32 performs limit processing to a torque command value Tref received from a higher-order system of the motor 1 so as not to exceed the torque limit value Tlmt and generates a gate signal for switching on and off a switching element of the main circuit 31 based on a torque command value after performing the limit processing. In this processing of the control units 32, a torque control technology of the patent document 2 may be applied.

Then, the main circuit 31 performs on-off control of each switching element based on the gate signal output from the control unit 32 to make a desired motor current I flow.

By the above operation, since the torque and electric current of the motor 2 can be reduced (namely, copper loss generated by the motor 2 can be reduced), in addition to the effects of the first to fifth embodiments, an increase in temperature of the coil of the motor 2 can be suppressed, and a deterioration in a lifetime and failure of the motor 2 can be suppressed. In addition, in the present embodiment, instead of the torque limit value Tlmt, a limit value Ilmt of a current command calculated in the control unit 32 may be set and output.

The invention claimed is:

1. A motor cooling system comprising:
   an oil pump for circulating cooling oil of a motor; and
   a determination unit configured to detect a decrease in the cooling oil when a standard deviation of a driving current of the oil pump with respect to a plurality of sampling points of the driving current is larger than a preset threshold value.

2. The motor cooling system according to claim 1, further comprising an inverter for driving the motor,
   wherein the determination unit outputs a torque limit value according to the standard deviation of the driving current when the decreasing of the cooling oil is detected, and
   wherein a control unit of the inverter outputs a gate signal for switching on and off a switching element of a main circuit of the inverter based on a torque command value after performing a limit processing to a torque command value received from a higher-order system of the motor so as not to exceed the torque limit value.

3. The motor cooling system according to claim 1, wherein the determination unit outputs a warning signal to an outside when the decreasing of the cooling oil is detected.

4. A motor cooling system comprising:
   an oil pump for circulating cooling oil of a motor; and
   a determination unit configured to detect a decrease in the cooling oil when a state in which a moving average value of a driving current of the oil pump which is obtained from a plurality of sampled data of the driving current is excessively smaller than a preset standard driving current by a certain amount is continued for a predetermined time.

5. The motor cooling system according to claim 4, further comprising an inverter for driving the motor,
   wherein the determination unit outputs a torque limit value according to the moving average value of the driving current when the decreasing of the cooling oil is detected, and
   wherein a control unit of the inverter outputs a gate signal for switching on and off a switching element of a main circuit of the inverter based on a torque command value after performing a limit processing to a torque command value received from a higher-order system of the motor so as not to exceed the torque limit value.

6. The motor cooling system according to claim 4, wherein the determination unit outputs a warning signal to an outside when the decreasing of the cooling oil is detected.

7. A motor cooling system comprising:
   an oil pump for circulating cooling oil of a motor; and
   a determination unit configured to detect a decrease in the cooling oil when a standard deviation of a rotation speed of the oil pump with respect to a plurality of sampling points of the rotation speed is larger than a preset threshold value.

8. The motor cooling system according to claim 7, further comprising an inverter for driving the motor,
   wherein the determination unit outputs a torque limit value according to the standard deviation of the rotation speed when the decreasing of the cooling oil is detected, and
   wherein a control unit of the inverter outputs a gate signal for switching on and off a switching element of a main circuit of the inverter based on a torque command value after performing a limit processing to a torque command value received from a higher-order system of the motor so as not to exceed the torque limit value.

9. The motor cooling system according to claim 7, wherein the determination unit outputs a warning signal to an outside when the decreasing of the cooling oil is detected.

10. A motor cooling system comprising:
    an oil pump for circulating cooling oil of a motor; and
    a determination unit configured to detect a decrease in the cooling oil when a state in which a moving average value of a rotation speed of the oil pump which is obtained from a plurality of sampled data of the rotation speed is excessively smaller than a preset standard rotation speed by a certain amount is continued for a predetermined time.

11. The motor cooling system according to claim 10, further comprising an inverter for driving the motor,
    wherein the determination unit outputs a torque limit value according to the moving average value of the rotation speed when the decreasing of the cooling oil is detected, and
    wherein a control unit of the inverter outputs a gate signal for switching on and off a switching element of a main circuit of the inverter based on a torque command value after performing a limit processing to a torque command value received from a higher-order system of the motor so as not to exceed the torque limit value.

12. The motor cooling system according to claim 10, wherein the determination unit outputs a warning signal to an outside when the decreasing of the cooling oil is detected.

13. A motor cooling monitoring method comprising:
    detecting a decrease in cooling oil of a motor when a standard deviation of a driving current or a rotation speed of an oil pump for circulating the cooling oil of the motor with respect to a plurality of sampling points of the driving current or the rotation speed is larger than a preset threshold value.

14. A motor cooling monitoring method in a motor cooling system including an oil pump for circulating cooling oil of a motor, comprising:
    detecting a decrease in the cooling oil when a state in which a moving average value of a driving current or a rotation speed of the oil pump which is obtained from a plurality of sampled data of the driving current or the rotation speed is excessively smaller than a preset standard driving current or a preset standard rotation speed by a certain amount is continued for a predetermined time.

* * * * *